Sept. 13, 1960 J. E. COFFIN 2,952,337
THERMOSTATIC DAMPER
Filed April 15, 1957 3 Sheets-Sheet 1
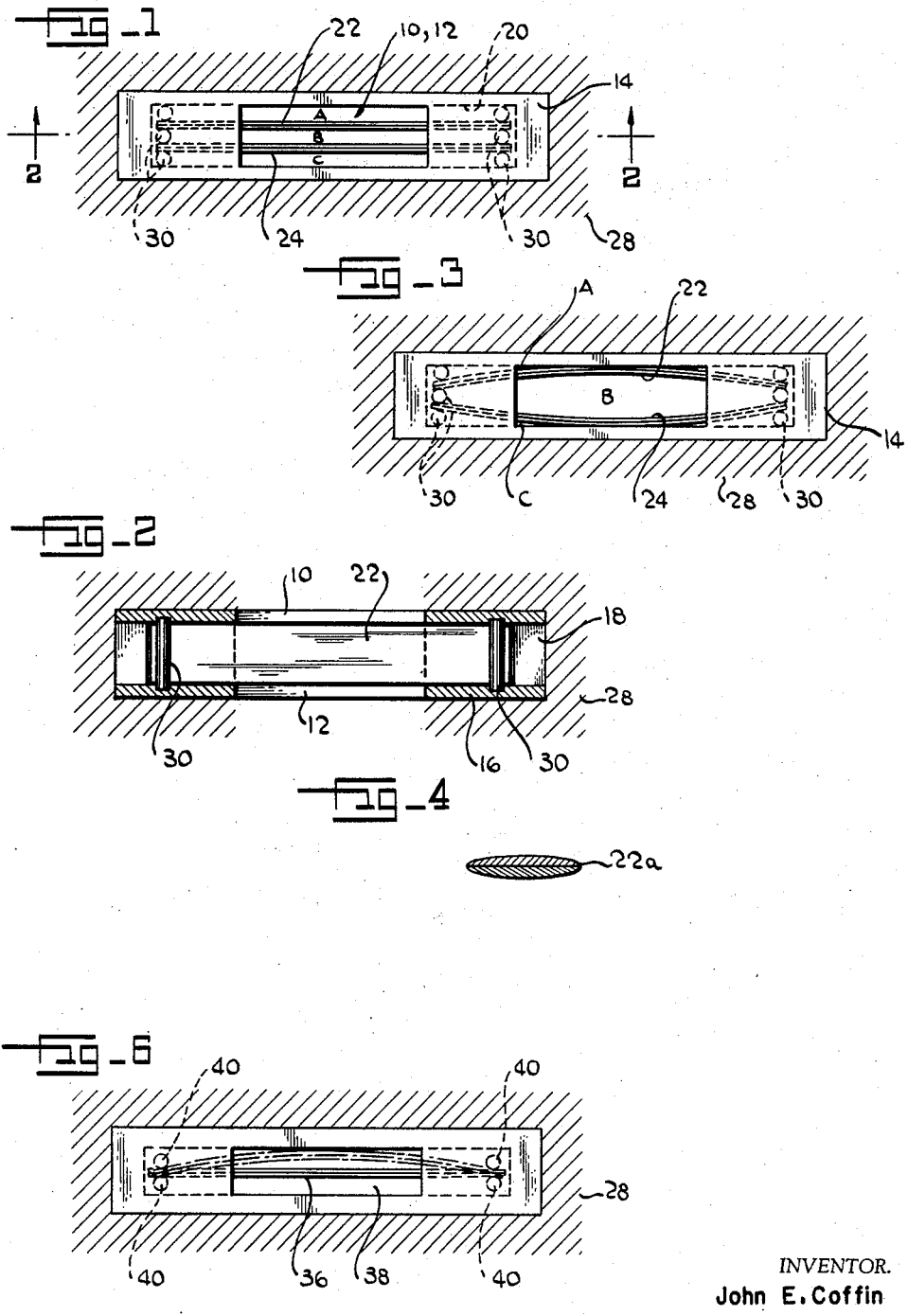
INVENTOR.
John E. Coffin
BY
Reynolds, Beach & Christensen
Attorneys Sept. 13, 1960 J. E. COFFIN 2,952,337
THERMOSTATIC DAMPER
Filed April 15, 1957 3 Sheets-Sheet 2
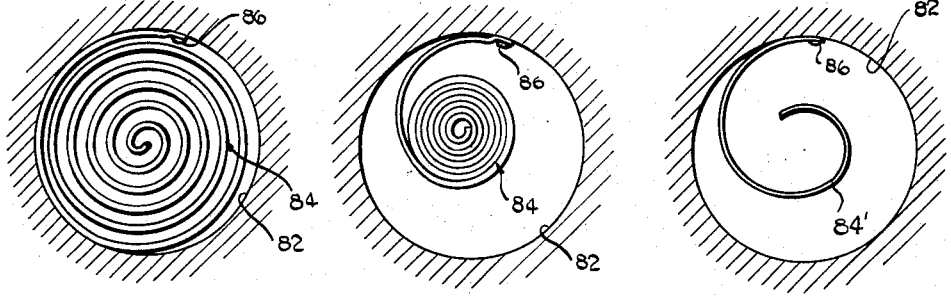
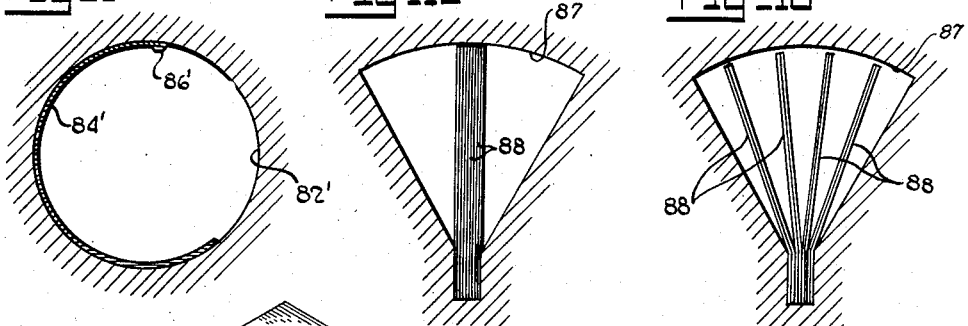
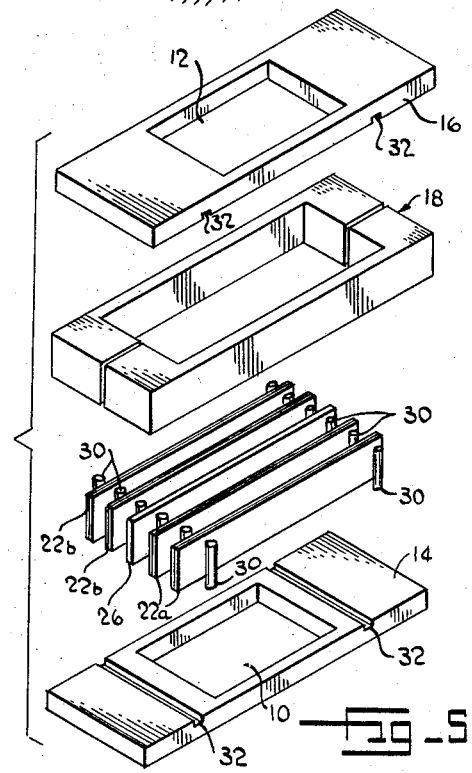
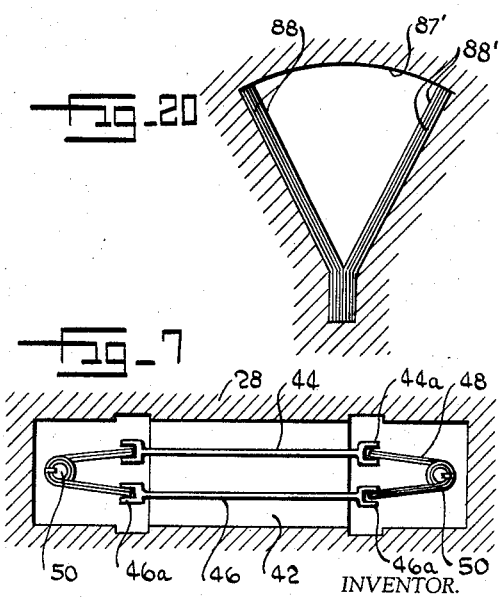
INVENTOR.
John E. Coffin
BY
Reynolds, Beach & Christensen
Attorneys Sept. 13, 1960
J. E. COFFIN
2,952,337
THERMOSTATIC DAMPER
Filed April 15, 1957
3 Sheets-Sheet 3
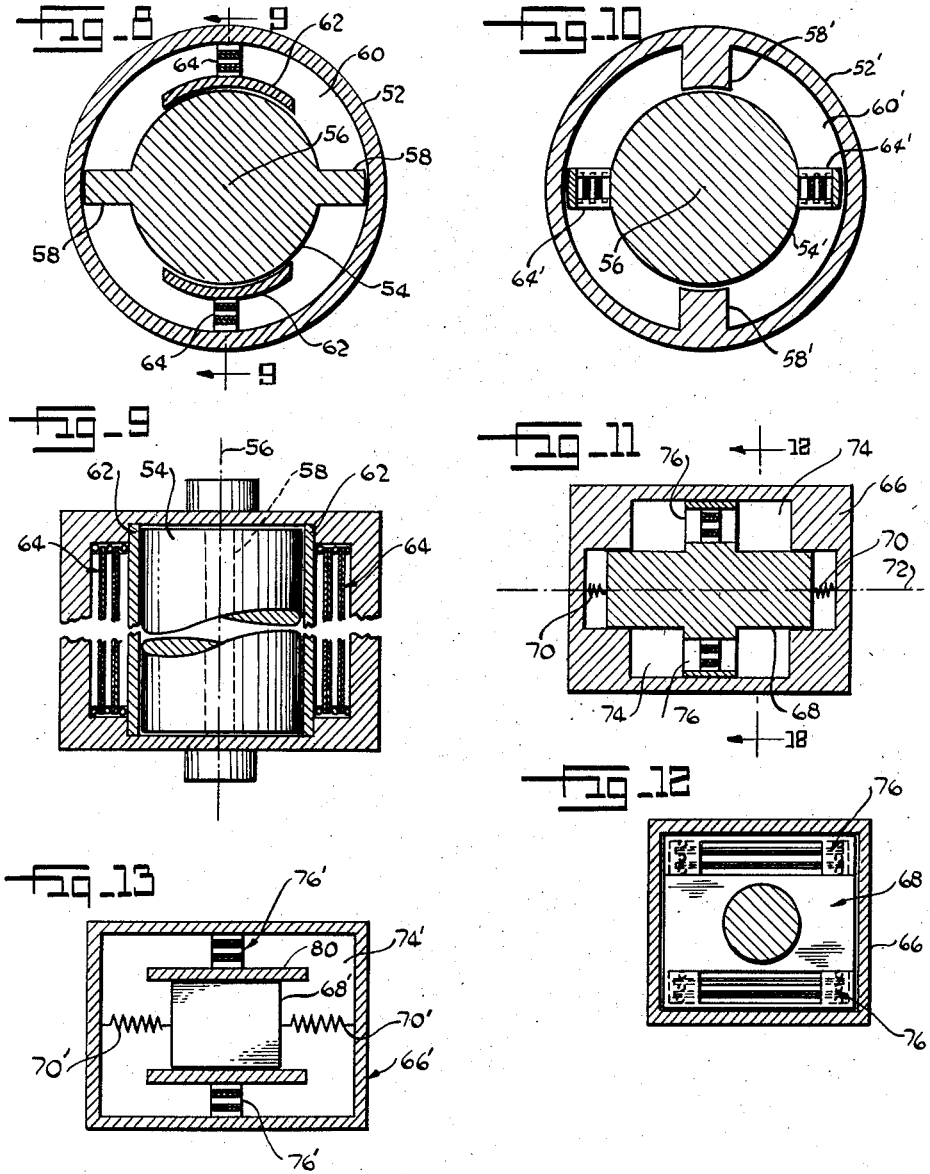
INVENTOR.
John E. Coffin
BY
Reynolds, Beach & Christensen
Attorneys United States Patent Office 2,952,337
Patented Sept. 13, 1960

2,952,337

THERMOSTATIC DAMPER

John E. Coffin, Seattle, Wash., assignor to Boeing Airplane Company, Seattle, Wash., a corporation of Delaware Filed Apr. 15, 1957, Ser. No. 652,926

15 Claims. (Cl. 188—100)

This invention relates generally to variable flow restrictor means and more particularly concerns an improved means of that type operable to compensate for changes in the viscosity of the damping fluid with changes of temperature in fluid damped devices in a manner maintaining or establishing predetermined response characteristics therein over a given operating temperature range. The invention is herein illustratively described by reference to its presently preferred forms as applied particularly to a rate gyro and a linear accelerometer; however, it will be recognized that certain modifications and changes therein with respect to details may be made without departing from the essential features involved and that the applications of the invention may vary. In broadest terms the invention provides a novel flow restrictor means to regulate the viscosity resistance pressure drop across itself in a passage containing liquid traversing the flow restrictor means.

In rate gyros and linear accelerometers, representing examples of a variety of instruments to which the invention may be applied, it is necessary to damp the motion of the sensing element so that it will respond to variations in the physical input with a minimum of transient error. Relative movement between the sensing element and the instrument case is opposed by the damping liquid to a degree depending upon the viscosity of the liquid. Unfortunately the best available damping liquids decrease in viscosity rapidly with increasing temperature. As a result, if the instrument is to maintain a constant or linear response characteristic over a wide ambient temperature range then it becomes necessary either to heat or cool the instrument in order to maintain constant temperature within, or to provide some form of automatic compensation for viscosity change.

An obvious way to compensate for temperature-induced changes of viscosity is to incorporate a temperature-controlled throttle or variable restriction in the path of flow of the damping liquid so as to vary the opening through the restriction as an inverse function of temperature. Total resistance to flow of the liquid is made up in large part by the resistance imposed by the restriction, thereby enabling variations of the latter to have adequate effect for purposes of achieving full compensation. However, there are three difficulties with most such devices. First of all, the inertial effect of a simple throttle type flow restrictor on the sensing element in the different settings of the throttle varied widely with temperature. Secondly, such inertial effect was relatively large, thereby preventing attainment of a high natural frequency in the instrument. Thirdly, rapid liquid flow produced turbulence at the throttle causing velocity squared damping and rectification effects, thereby unduly limiting the permissible displacement rate of the sensing element in a precision instrument.

An object of the present invention is to provide temperature-induced viscosity change compensation in such devices overcoming the above-mentioned shortcomings and limitations of prior throttle type compensators.

More specifically, it is an object of this invention to compensate for temperature-induced damping fluid viscosity change in a fluid damped instrument or device wherein the damping fluid may be caused to transverse a variably restricted opening, so formed and operated in response to temperature change as to maintain a constant response characteristic in the device throughout a wide range of temperatures. Alternatively, the apparatus of the invention may be so formed and adapted as to over-compensate or undercompensate, if desired, thereby to establish a predetermined variable response characteristic as a function of temperature change.

Another specific object of the invention is to achieve the foregoing objectives by means which may be so designed as to have little or no inertial effect on the member whose movements are being damped by the viscous liquid, and so that any such effect which is produced will be substantially constant throughout a wide range of temperature.

Still another specific object is to provide such compensating means which will permit a smooth flow pattern of the damping liquid passing through it, thereby to minimize turbulence and consequent non-linear damping and rectification effects at high flow velocities.

The foregoing and related objects are achieved by providing a restricted opening through which the liquid passes accompanying relative movement of the sensing member or other movable member in the fluid damped device, and by mounting in said restricted opening one or more dividers, preferably bimetal strips, moved back and forth laterally across the opening by increase or decrease of temperature so as to vary the effective width, more particularly the ratio of widths, of divisional flow spaces formed thereby. Such temperature-induced movements of the flow dividers vary the viscous resistance of the unit and by proper design may be caused to provide substantially complete temperature compensation in the instrument. In such a flow restrictor viscous flow reaction pressure or resistance varies inversely with the cube of the width of the gaps or flow spaces defined by the dividers. Inertial reaction pressure, on the other hand, varies as the dimension of the flow dividers measured along the path of flow of the liquid between them, and inversely as the product of their relative spacing and their exposed length. Thus the required viscous reaction effect may be achieved while at the same time designing for negligible inertial reaction effect. Preferably the flow divider elements are relatively thin strips and if desired may be made of a streamlined form so as to produce minimum turbulence at high velocity flow rates.

These and other features, objects, and advantages of the invention will become more fully evident from the following description thereof by reference to the accompanying drawings.

Figure 1 is a side view of the viscosity compensating flow restrictor in a simple one-pair version of its preferred form, with the bimetal strips in the form they assume at the upper limit of the operating temperature range.

Figure 2 is a sectional view of the same taken on line 2—2 in Figure 1.

Figure 3 is an operating view similar to Figure 1 with the bimetal strips in the form they assume at the lower end of the operating temperature range.

Figure 4 is a transverse sectional view of a sepecially formed bimetal strip alternatively usable in the device.

Figure 5 is an exploded perspective view of a compensating flow restrictor assembly following generally the form shown in Figures 1, 2 and 3 but incorporating an additional pair of bimetal strips and a non-bimetal flow divider between the pairs.

Figure 6 is a view similar to Figure 1 of a modified form of compensating flow restrictor using a single bimetal strip.

Figure 7 is a view similar to Figure 1 of a modified restrictor in which the flow dividers are not bimetal strips but are actuated by bimetal elements to produce the equivalent result.

Figure 8 is a simplified transverse sectional view of a rate gyro instrument incorporating the invention in an arrangement wherein two compensating flow restrictors are fixed to the instrument case and the damping liquid is pumped through the passages in which the restrictors are situated by vanes mounted on and movable with the gimbal assembly.

Figure 9 is a simplified sectional view taken on line 9—9 in Figure 8.

Figure 10 is a view similar to Figure 8 wherein the positions of the restrictors and vanes are interchanged.

Figure 11 is a simplified longitudinal sectional view of an accelerometer incorporating the invention, wherein two flow restrictors are mounted on the movable member of the instrument for movement in and along fluid passage spaces.

Figure 12 is a simplified sectional view taken on line 12—12 in Figure 11.

Figure 13 is a view similar to Figure 11, wherein the accelerometer is modified to permit the flow restrictors to occupy fixed positions in the instrument casing.

Figure 14 is a simplified side view of another modified viscosity compensating flow restrictor in the high temperature setting assumed by it.

Figure 15 is a view of the restrictor of Figure 14 in the low temperature setting.

Figure 16 is a view similar to Figure 14 of a variation of the restrictor shown in the latter, in its high temperature setting.

Figure 17 is a view showing the flow restrictor of Figure 16 in its low temperature setting.

Figure 18 is a simplified side view of still another modified flow restrictor in its high temperature setting.

Figure 19 is a view of the same flow restrictor in its low temperature setting.

Figure 20 is a similar view of a variation of the restrictor in Figure 18, in the low temperature setting.

Figures 1 to 5, inclusive, illustrate the presently preferred form of the viscosity compensating flow restrictor suitable for incorporation in a fluid damped instrument. The fluid damped instrument itself is not shown in these figures except for a simplified showing of a fluid passageway casing 28, representing part of the instrument. It will be understood that the compensating flow restrictor is so positioned within or in relation to the movable member (not shown) of the instrument that relative movement of the movable member causes damping fluid to traverse the flow restrictor.

The flow restrictor shown in these first figures includes a restricted opening defined essentially by the rectangular apertures 10 and 12 formed in the rectangular plates 14 and 16, respectively. The apertures 10 and 12 are of equal size and the plates are assembled with the apertures in alignment. Between the plates 14 and 16 are mounted the complemental segments of a rectangular spacer plate 18 having an aperture 20 the length of which preferably exceeds the length of apertures 10 and 12 and the width of which approximates that of the latter two apertures. The aperture space within the spacer plate 18 is occupied by one or more pairs of parallel bimetal strips. In the case of more than one pair of bimetal strips a non-bimetal strip 26 of constant form and position is interposed midway between adjacent pairs. In the illustration of Figure 5 two pairs of bimetal strips, 22a, 22a and 22b, 22b and one intermediate non-bimetal strip 26 are employed, whereas in the simpler version appearing in Figures 1, 2 and 3, only two bimetal strips, 22 and 24, are employed. The operating principle is the same in either instance.

The bimetal strips are arranged in equally spaced parallel relationship to each other and to the intervening non-bimetal strip, if any, with the planes of the bimetal strips extending parallel to the direction of flow of damping fluid through the aligned openings 10, 12 and 20, so that the strips are presented edgewise to the flow. The strips are mounted in a manner permitting them to undergo varying longitudinal curvature in response to temperature change. For this purpose the ends of the bimetal strips are held slidably between parallel spacer pins 30 the opposite ends of which are retained in the opposing grooves 32 formed in the inner faces of the outer plates 14 and 16 as shown. The assembled elements then appear as in Figures 1, 2 and 3.

In Figure 1 when the bimetal strips 22 and 24 are substantially flat in form they divide the restricted flow opening defined by the aligned apertures 10 and 12 into three equal slits or flow spaces A, B and C. This represents the setting assumed by the bimetal strips at the upper end of the design operating temperature range of the compensating flow restrictor. In Figure 3, the outside gaps A and C have been reduced in width substantially to zero whereas the inside gap B is much wider than it was originally and in fact occupies substantially the full width of the flow opening. This represents the setting assumed by the bimetal strips at the lower end of the design operating temperature range. In this setting the strips may contact the aperture side walls in plate 18. Outward bowing of the strips with a drop of temperature to effect this result is achieved by placing the high coefficient metal in the strip on the inside face thereof adjacent the other strip.

Preferably the strips themselves are materially longer than the flow opening defined by the aligned apertures 10 and 12 and are arranged so that their opposite end portions are masked by the corresponding solid end portions of the plates 14 and 16. As a result only the intermediate portions of the strips are presented to the flow of damping liquid. This is done so that the outer gaps or divisional flow spaces A and C are reduced substantially to zero width through their entire length in the low temperature setting assumed by the strips, while the intermediate flow space B is then of substantially uniform width throughout its length. In such a device it is found that the resistance to flow of damping liquid through the opening occupied by the flow divider strips varies approximately inversely with the sum of the cubes of the widths of the slits or gaps A, B and C defined by the strips. Thus, the viscous flow resistance of three equal narrow slits or divisional flow spaces as in Figure 1 is approximately nine times that of a single wide flow space as in Figure 3. If the bimetal strips are of the same length as the flow opening 10, 12 a variation of viscous flow resistance of only about five to one is attainable with this general configuration.

Perhaps the most significant feature of the improved viscosity compensating flow restrictor is the very small and substantially constant inertial reaction pressure which is manifest throughout the operating temperature range. It may be shown that such pressure is proportional to the width of the bimetal strips measured in their respective planes in a direction perpendicular to their length (i.e., the width appearing in Figure 2) and inversely proportional to the product of the width of the spacing between adjacent strips and the length of the strip exposed to fluid flow. It is found that this inertial reaction pressure is the same at the highest operating temperature as it is at the lowest operating temperature and reaches a maximum value which is 45% greater at a temperature in the middle of the operating range. Even its latter value is negligible, however, as a factor influencing the natural frequency of the instrument being damped and as a factor determining the upper limit of natural frequency which may be attained in any such instrument. In other words, the improved flow restrictor compensating for changes in viscosity with temperature operates for its intended purpose without adversely affecting the response characteristics of the instrument. Design of any such flow restrictor to achieve this result is a comparatively simple matter since viscous reaction effect varies as the sum of the cubes of gap width whereas inertial reaction effect varies as the sum of the ratios mentioned above involving the inverse first power of the gap widths.

In order for the compensating flow restrictor to have adequate effect for providing full compensation obviously its viscous flow resistance must be established by design to a value which materially exceeds the viscous flow resistance otherwise developed in the fluid damped instrument or other device at the upper temperature limit of operation, so that the sum of these two values of flow resistance will remain substantially constant throughout the operating temperature range. In order to achieve this result it is necessary or desirable to situate the compensating flow restrictor in a confined passage so that a substantial portion, if not all, of the damping liquid subject to displacement or confined against displacement is required to traverse the flow restrictor.

In Figure 4 a single bimetal strip 22a of streamlined form is shown in cross-section. While for most applications the bimetal strip flow dividers used in the flow restrictor need not be of special streamlined configuration, still where high flow velocities without turbulence are required a streamlined configuration is of help. The very fact that the flow divider elements may be thin is in itself of material aid in preventing velocity squared damping and rectification effects caused by turbulence.

In Figure 6 a single bimetal strip 36 is incorporated in the modified flow restrictor. This strip extends lengthwise of the opening 38 and its ends, projecting materially beyond the sides of the opening, are slidably mounted between pairs of supporting pins 40 as in the first described embodiment. The strip 36 in its straight condition, corresponding to the upper end of the operating temperature range, divides the flow opening 38 into two equal divisional flow spaces. As temperature drops the strip curves progressively toward its limiting dotted line position shown in Figure 6 wherein it contacts the side of the frame member to reduce one of the divisional flow spaces substantially to zero and correspondingly increases the other to substantially the full size of the opening 38. The resultant effect is generally similar to that achieved in the embodiment shown in Figure 1 although the variation of flow resistance produced by a single strip as compared with a pair of strips is less. As previously mentioned the conversion of three equal divisional flow spaces as in Figure 1 to a single large flow space as in Figure 3 changes the viscous flow resistance by a factor of nine. In Figure 6, on the other hand, the variation of the viscous flow resistance varies with the sum of the squares of the widths of the gaps, so that a total maximum variation of only four to one is achieved.

The advantage of an arrangement such as that in Figure 5 wherein a plurality of fixed openings each having one or more flow divider strips is the greater total flow opening that may be accommodated within the limitations of maximum lateral deflection permitted by any one flow divider strip. In small instruments wherein the total volumetric flow of damping fluid is small or the viscous flow resistance of the flow restrictor is permitted to be relatively large, a simple opening with one or more flow dividers extending across it may suffice. As larger total openings or relatively small viscous flow resistance is required, however, practical design considerations may dictate the multiple sets of flow dividers as in Figure 5.

In the modification shown in Figure 7, the flow restricting opening 42 is divided into three divisional flow spaces by inflexible, straight non-bimetal strips 44 and 46. At the upper operating temperature these strips are spaced equally from the respective adjacent side walls of the opening 42 and from each other so as to form three equal flow spaces. The ends of these strips are provided with sockets 44a and 46a respectively, which receive the free ends of V-shaped bimetal elements 48 mounted at their apices on pin supports 50. The bimetal elements are adapted to expand and contract with temperature change so as to vary the separation between the strips 44 and 46. The arrangement is such that the strip 44 is moved laterally toward the adjacent wall of the opening 42 while strip 46 is moved laterally in the opposite sense as temperature drops progressively toward the lower operating limit of the device. The results are therefore equivalent to those achieved in the form shown in Figure 1.

Figure 8 illustrates one specific application of the viscosity compensating flow restrictor, namely, a rate gyro such as that disclosed and claimed in patent application Serial No. 474,648, now Patent No. 2,817,974, filed December 13, 1954, jointly in the name of Benjamin C. Muzzey, Heinz Recker, and Virgil Jones Sims, Jr. Figures 8 and 9 constitute a simplified showing of a rate gyro of this general type, consisting of a fluid casing 52 in which a gimbal assembly 54 is mounted to pivot on an axis 56. Vanes 58 project from the gimbal assembly housing into a surrounding fluid passage 60 containing damping fluid. At opposite sides of the gimbal assembly, at circumferential locations intermediate the vanes 58, are mounted stationary supports 62 of arcuate form disposed closely adjacent the outer surface of the gimbal assembly casing. These supports 62 in conjunction with the instrument case 52 provide a means for mounting the stationary flow restrictors 64 extending generally in radial planes therebetween. The flow restrictors may be similar, for example, to that shown in Figure 1. The bimetal strips in the flow restrictors assume a straight condition at the upper operating temperature of the instrument, defining three equal flow spaces through each flow restrictor. As operating temperature drops progressively toward the lower limit the strips curve away from each other to the positions corresponding to the positional relationship shown in Figure 3. Thus rotary movement of the gimbal assembly about the axis 56, hence of the vanes 58, pumping damping fluid through the flow restrictors, is subjected to a viscous flow resistance which varies in accordance with temperature changes in order to compensate for the variation of viscous drag imposed by the changing viscosity of the liquid. The desired response characteristics of the rate gyro are thereby maintained throughout the operating temperature range.

In Figure 10 the instrument casing 52' has stationary vanes or baffles 58' dividing the annular damping fluid compartment 60' into two sections in which the flow restrictors 64' are respectively situated. In this case the flow restrictors are mounted on the gimbal casing 54' as paddles, so that as the gimbal assembly rotates about the axis 56 damping liquid is required to traverse the flow restrictor openings. The action and effect of the flow restrictors are essentially the same in this version of the rate gyro application as in that shown in Figure 8.

In Figure 11 the principle of the viscosity compensating flow restrictor is applied to a lineal displacement type instrument, namely, a lineal accelerometer comprising a casing 66 containing and guiding a movable member 68 of predetermined mass. Springs 70 interconnecting the movable member and the casing tend to maintain the movable member in a centered position, as shown. However, acceleration forces acting on the movable member relative to the casing 66 along the axis 72 produce displacement of the movable member in the casing against the recentering forces of the springs 70. In order to damp this movement, liquid is incorporated in the casing in the space 74 surrounding the movable member so as to impose a viscous drag thereon. In order to compensate for variations of viscosity with temperature, flow restrictors 76, similar to that shown in Figure 1, for example, may be mounted on the movable member to occupy the one or more passages or compartments comprising the space 74 so as to be traversed by the damping fluid accompanying movement of the member 68. This arrangement of the flow restrictors corresponds to that of the rate gyro shown in Figure 10 wherein the flow restrictors are also mounted on the movable element.

In Figure 13 the view depicts a cross section of a generally box-like casing. The flow restrictors 76' are fixed in the casing 66', between the sides of the casing and spaced parallel strips 80 mounted in fixed positions extending between opposite side walls of the casing. The strips 80 guide the movable member 68' for longitudinal sliding movement between these strips. Springs 70' tend to maintain the movable member 68' centered lengthwise between the strips 80. In effect the movable member 68' is a pump piston, which displaces damping liquid around the circulation spaces 74' defined between the strips 80 and the casing. The viscosity compensating flow restrictor elements 76' are installed in fixed positions in these circulation passages.

While the flow restrictor configurations thus far described are perhaps the simplest from the geometric standpoint and from the design standpoint, it will be recognized that other configurations may be used which employ the principles of the invention. Certain examples of these are shown in Figures 14 to 20, inclusive. In Figure 14 the flow restricting opening 82 is of circular form, and may, for example, represent the interior of a circular pipe or conduit comprising a damping fluid passage in a fluid-damped instrument or other device, or comprising a passage interconnecting parts of a fluid system in which it is desired to impose a desired viscous drag effect which varies with temperature of the liquid. In this embodiment a spiral bimetal strip 84 is mounted by its outer end secured by a screw or pin 86 to the wall of the passage 82, with the plane of the spiral bimetal strip disposed perpendicularly to the length of the passage. At the upper operating temperature of the system the coils of the bimetal strip occupy substantially equal spacings in relation to each other and to the surrounding passage wall, as shown in Figure 14 thereby defining a long and narrow flow space of spiral form. However, as temperature progressively drops to the lower operating limit of the system for which the flow restrictor is to function, the bimetal strip coils up progressively tighter to its limiting position shown in Figure 15, wherein the coils are wrapped tightly together. This result is of course achieved by placing the high coefficient metal of the bimetal strip on the inside face of the strip. In effect the change of form of the spiral bimetal strip from its condition in Figure 14 to that in Figure 15 causes a progressive decrease in the total viscous flow resistance imposed by the strip in the flow passage 82, without materially changing the inertial reaction effect of the strip, in accordance with the principles discussed above in conjunction with the first described form of the invention.

In the variation shown in Figures 16 and 17 the bimetal strip 84' mounted in the circular passage 82' is also of spiral configuration, but instead of placing the high coefficient side of the strip on the inside face thereof, it is placed on the outside face, with the result that with a reduction of temperature from the upper value corresponding to the position of the strip in Figure 16 to a lower value, the strip uncoils and assumes a position lying flatly against the passage wall as in Figure 17. The result is generally equivalent to that achieved in the embodiment of Figures 14 and 15, inasmuch as a long and narrow flow space is converted into a wide flow space of essentially the same flow area, as temperature changes from the upper to the lower end of the operating range.

In the variation shown in Figures 18 and 19, the flow passage 87 is of nearly triangular or circular segmental form, and the flow divider strips comprise arms 88 which project radially across the opening from the apex corner thereof. In the upper temperature condition the arms 88 divide the space to equal sectors. In the illustration four such arms are employed, two on either side of the center line. The two arms on either side of the center line have their high coefficient sides facing toward the remaining two arms, so that as the temperature drops, the arms move progressively together to the position shown in Figure 19, corresponding to the lower operating temperature limit of the device. Thus four relatively narrow divisional flow spaces are converted into two relatively wide flow spaces as temperature decreases through the operating range.

In Figure 20 the basic configuration of Figure 18 is employed, but in this case the high coefficient sides of the bimetal strips 88' face away from the center line, so that as temperature drops, the two strips on each side of the center line move progressively toward contact with each other and with the adjacent sides of the opening 87'. In this version four divisional flow spaces of narrow width are converted into a single wide flow space, thereby enhancing the effect achieved to a lesser degree in Figure 19.

I claim as my invention:

1. A fluid damped device comprising container means including therein a body of damping fluid, a movable member guided for movement in relation to said container means, and flow restricting orifice means within said container means including elements defining a restricted flow space and including at least one flow divider element dividing the flow space into a plurality of smaller divisional flow spaces each permitting restricted passage of the damping fluid, said first-mentioned elements and flow divider element being relatively movable transversely in relation to the direction of flow through said divisional spaces to vary the relative sizes of said divisional spaces, said orifice means comprising means controlled by temperature of the damping fluid and acting on at least one of said elements to vary the spacing between said flow divider element and adjacent elements to increase one divisional flow space while decreasing another with progressive temperature change in one direction, and to decrease said one divisional flow space while increasing said other with reverse temperature change, throughout a predetermined operating temperature range, said movable member, said flow restricting orifice means and said container means being cooperatively arranged to effect relative flow of the damping fluid through said flow spaces accompanying relative movement of said movable member, thereby to effect damping of the latter's movement to a degree partly dependent on relative positioning of said divider element and first-mentioned elements.

2. The fluid damped device defined in claim 1, wherein the flow restricting orifice means elements are connected to the movable member to move conjointly therewith relative to the container means.

3. The fluid damped device defined in claim 1, wherein the flow restricting orifice means elements are fixed to the container means, and wherein the movable member includes means to displace damping fluid through the flow spaces by relative movement of such member.

4. The fluid damped device defined in claim 1, wherein the container means includes a restricted passage for damping fluid, the flow restricting orifice means being situated in said passage and passing substantially the entire flow of fluid moving through said passage.

5. The fluid damped device defined in claim 1, wherein the flow divider element comprises a relatively thin bimetal strip extending across the first-mentioned flow space with the thickness dimension of the strip extending perpendicular to the direction of flow through the flow space, said strip distorting with change of temperature of the damping fluid to vary the relative sizes of the divisional flow spaces.

6. A fluid damped device comprising container means including therein a body of damping fluid, a movable member guided for movement in relation to said container means, and flow restricting orifice means within said container means including elements defining a restricted flow space and including at least one flow divider element dividing the flow space into a plurality of smaller divisional flow spaces each permitting restricted passage of the damping fluid, said first-mentioned elements and flow divider element being relatively movable transversely in relation to the direction of flow through said divisional spaces to vary the sizes of said divisional spaces, said orifice means comprising means controlled by temperature of the damping fluid and acting on at least one of said elements to vary the spacing between said flow divider element and adjacent elements and thereby vary said flow spaces in a manner whereby the sum of the cubes of the cross-sectional areas thereof progressively increases with progressive temperature change in on one direction, and progressively decreases with reverse temperature change, throughout a predetermined operating temperature range, said movable member, said flow restricting orifice means and said container means being cooperatively arranged to effect relative flow of the damping fluid through said flow spaces accompanying relative movement of said movable member, thereby to effect damping of the latter's movement to a degree at least partly compensated for temperature-induced change of viscosity of the damping fluid.

7. The fluid damped device defined in claim 6, wherein the first-mentioned elements define an orifice opening of substantially fixed dimensions and the flow divider element comprises an elongated thin strip extending across said opening with its thickness dimension perpendicular to the flow through the opening, said strip being movable transversely of its length and of the direction of flow to vary the divisional flow spaces.

8. The fluid damped device defined in claim 6, wherein the first-mentioned elements define an orifice opening of substantially fixed dimensions and the flow divider elements comprise a plurality of elongated thin strips extending in spaced relation across said opening with their thickness dimensions perpendicular to the flow through the opening, at least certain of said strips being movable relatively transversely of their length and of the direction of flow to vary the divisional flow spaces.

9. The fluid damped device defined in claim 8, wherein the orifice opening formed is of generally rectangular form, and the relatively movable flow divider strips comprise a pair of bimetal strips arranged to deflect oppositely with temperature change, said pair of bimetal strips extending substantially parallel to one side of the opening and being substantially straight at the upper temperature in the operating temperature range to form three elongated narrow divisional flow spaces of substantially equal width between strips, said strips being adapted to flex away from each other with decreasing temperature to increase one of the three flow spaces while decreasing the other two progressively with temperature reduction.

10. The fluid damped device defined in claim 9, wherein the length of the bimetal strips materially exceed the parallel dimension of the opening and their ends project beyond the sides of the opening, and means slidably supporting such strip ends to permit longitudinal movement of such strips in their respective supporting means accompanying temperature induced contraction and expansion of the strips.

11. In a fluid damped device, container means defining a space containing damping fluid, flow restricting means extending across said space and having elements defining a plurality of openings permitting passage of such damping fluid through said flow restricting means, said elements being relatively movable to vary the relative size of said openings, said flow restricting means including means sensitive to fluid temperature arranged to move said elements relatively from relative positions defining substantially equal openings to relative positions in which one such opening is materially larger than another, accompanying progressive change of temperature from a high value to a relatively low value, thereby to produce a decreasing restriction to flow of said fluid through said flow restricting means, and a member to be damped, movable in relation to said container means, said flow restricting means, said member and said container means being cooperatively arranged to produce relative flow of the damping fluid through said openings by relative movement of said member, variable positioning of said elements substantially compensating for temperature-induced changes of viscosity of the fluid with respect to the effect thereof on the response of the member to forces tending to produce such movement thereof.

12. In a fluid damped device, container means defining a space containing damping fluid, flow restricting means extending across said space and having elements defining a plurality of openings permitting passage of such damping fluid through said flow restricting means, at least one of said elements comprising a bimetal strip movable in relation to other elements by change of temperature to vary the relative sizes of said openings, from relative positions defining substantially equal openings to relative positions in which one such opening is materially larger than another, accompanying progressive change of temperature from a high value to a relatively low value, thereby to produce a decreasing restriction to flow of said fluid through said flow restricting means, and a member to be damped, movable in relation to said container means, said flow restricting means, said member and said container means being cooperatively arranged to produce relative flow of the damping fluid through said openings by relative movement of said member, variable positioning of said elements substantially compensating for temperature-induced changes of viscosity of the fluid with respect to the effect thereof on the response of the member to forces tending to produce such movement thereof.

13. In a fluid damped device, container means defining a space containing damping fluid, flow restricting means extending across said space and having elements defining a plurality of openings permitting passage of such damping fluid through said flow restricting means, said elements including a plurality of relatively fixed elements spaced apart to define a plurality of flow spaces arranged side by side, and at least one element extending across each flow space to divide the same into divisional flow spaces, said latter element comprising a bimetal strip disposed edgewise to the flow, said bimetal strip elements deflecting with changes of temperature to increase one divisional flow space while decreasing another progressively for increasing the ratio thereof with decrease of fluid temperature, and a member to be damped, movable in relation to said container means, said flow restricting means, said member and said container means being cooperatively arranged to produce relative flow of the damping fluid through said flow restricting means by relative movement of said member, the temperature-induced deflection of said bimetal strips occurring at a rate varying the restricting effect of said flow restricting means substantially to compensate for temperature-induced viscosity change of the damping fluid as it produces damping of the motion of said member.

14. In combination, means defining a passageway containing liquid subject to change of viscosity with temperature variation, and variable flow divider means including at least one element extending transversely to said passageway to divide the flow of liquid traversing said element lengthwise of said passageway, said flow divider means comprising means operable to move said element bodily transversely of the passageway, automatically in response to temperaure change thereby to vary the ratio between the quantities of flow passing the respective sides of said element and thereby vary the flow restricting effect of the element in the passageway as a function of changing temperature independently of any incidental change of area of the element presented in a plane through the element and perpendicular to the direction of flow incident on said element, said first means and said variable flow divider means being cooperatively arranged to effect traversal of said flow divider means by liquid in said passageway.

15. The combination defined in claim 14, wherein the flow divider means comprises a pair of generally parallel bimetal strips extending transversely to the passageway to define substantially equal flow spaces for liquid traversing said strips at an upper value of temperature, said strips being inherently curved by reduction of temperature to increase at least one such flow space while decreasing another.

References Cited in the file of this patent

UNITED STATES PATENTS

| | | |
|---|---|---|
| 1,883,514 | Boyer | Oct. 18, 1932 |
| 2,821,268 | Carbon | Jan. 28, 1958 |

FOREIGN PATENTS

| | | |
|---|---|---|
| 1,131,684 | France | Oct. 22, 1956 |